(12) United States Patent
Aoki et al.

(10) Patent No.: US 7,336,346 B2
(45) Date of Patent: Feb. 26, 2008

(54) DISTANCE MEASURING DEVICE AND METHOD THEREOF

(75) Inventors: Akihiro Aoki, Kanagawa (JP); Yutaka Nakamura, Kanagawa (JP); Koji Sasaki, Kanagawa (JP); Toshihiro Uchimura, Kanagawa (JP); Futoshi Osada, Kanagawa (JP); Hayami Kikawa, Kanagawa (JP)

(73) Assignee: Sokkia Co., Ltd., Kanagawa (JP)

( * ) Notice: Subject to any disclaimer, the term of this patent is extended or adjusted under 35 U.S.C. 154(b) by 84 days.

(21) Appl. No.: 11/435,284

(22) Filed: May 17, 2006

(65) Prior Publication Data

US 2006/0285102 A1    Dec. 21, 2006

(30) Foreign Application Priority Data

Jun. 16, 2005    (JP)    ............................. 2005-176046

(51) Int. Cl.
*G01C 3/08* (2006.01)
(52) U.S. Cl. ................... 356/5.1; 356/5.15; 356/5.11; 356/5.12; 356/5.09
(58) Field of Classification Search ...... 356/4.06–4.07, 356/4.1, 5.09, 5.1, 5.11, 5.12, 5.13, 5.15
See application file for complete search history.

(56) References Cited

U.S. PATENT DOCUMENTS

| | | | |
|---|---|---|---|
| 6,369,880 B1 * | 4/2002 | Steinlechner | 356/5.11 |
| 6,463,393 B1 * | 10/2002 | Giger | 702/97 |
| 6,876,441 B2 * | 4/2005 | Barker | 356/5.09 |
| 6,940,599 B1 * | 9/2005 | Hovde | 356/432 |
| 7,177,014 B2 * | 2/2007 | Mori et al. | 356/5.09 |
| 2005/0168719 A1 * | 8/2005 | Stierle et al. | 356/4.01 |

FOREIGN PATENT DOCUMENTS

JP    2004-264116    9/2004

* cited by examiner

*Primary Examiner*—Sang H Nguyen
(74) *Attorney, Agent, or Firm*—Roberts, Mlotkowski & Hobbes; Thomas W. Cole (57) ABSTRACT

A distance measuring device is provided that reduces the time required for a distance measurement without degrading accuracy of the measured value. The distance measuring device includes a reference signal oscillator (26) that generates a reference signal (K), a light source (20) that emits a distance measuring light (L) modulated based on the reference signal, a light receiving element (28) that receives the distance measuring light reflected from a target (22) and converts the distance measuring light to a distance measuring signal (M), a frequency converter (37) that converts the distance measuring signal to an intermediate frequency signal, an A/D converter (42) that samples the intermediate frequency signal in synchronization with the reference signal, a memory (46) that stores data of the sampled intermediate frequency signal, and a CPU (44) that calculates a distance based on the intermediate frequency signal data, the CPU calculates amplitude of each frequency of the intermediate frequency signal based on the intermediate frequency signal data, determines an average of the amplitude, and ends sampling to calculate a distance when the number of pieces of the intermediate frequency signal data is equal to or more than a minimum required number and the average has become equal to or more than a predetermined value.

5 Claims, 7 Drawing Sheets

$$\alpha \sin(\theta + \beta) = \sum_{i=1}^{N} A_i \sin(\theta + \phi_i)$$

$$= \sqrt{\left(\sum_{i=1}^{N} A_i \sin\phi_i\right)^2 + \left(\sum_{i=1}^{N} A_i \cos\phi_i\right)^2} \sin\left(\theta + \tan^{-1} \frac{\sum_{i=1}^{N} A_i \sin\phi_i}{\sum_{i=1}^{N} A_i \cos\phi_i}\right) \quad (1)$$

$$\beta = \tan^{-1} \frac{\sum_{i=1}^{N} A_i \sin\phi_i}{\sum_{i=1}^{N} A_i \cos\phi_i} \quad (2)$$

$$\frac{\partial \beta}{\partial \phi_i} = \frac{A_i}{\sqrt{\left(\sum_{j=1}^{N} A_j \cos\phi_j\right)^2 + \left(\sum_{j=1}^{N} A_j \sin\phi_j\right)^2}} \sin\left(\phi_i + \tan^{-1} \frac{\sum_{j=1}^{N} A_j \cos\phi_j}{\sum_{j=1}^{N} A_j \sin\phi_j}\right)$$

$$= \frac{A_i}{\sqrt{\sum_{j=1}^{N} A_j^2 + \sum_{j,k=1, j\neq k}^{N} \{A_j A_k \cos(\phi_j - \phi_k)\}}} \sin\left(\phi_i + \tan^{-1} \frac{\sum_{j=1}^{N} A_j \cos\phi_j}{\sum_{j=1}^{N} A_j \sin\phi_j}\right) \quad (3)$$

$$\frac{\partial \beta}{\partial \phi_i} = \frac{A_i}{\sqrt{\sum_{j=1}^{N} A_j^2 + \sum_{j,k=1, j\neq k}^{N} \{A_j A_k\}}} \sin\left(\phi_i + \tan^{-1} \frac{\sum_{j=1}^{N} A_j \cos\phi_j}{\sum_{j=1}^{N} A_j \sin\phi_j}\right)$$

$$= \frac{A_i}{\sqrt{\left(\sum_{j=1}^{N} A_j\right)^2}} \sin\left(\phi_i + \tan^{-1} \frac{\sum_{j=1}^{N} A_j \cos\phi_j}{\sum_{j=1}^{N} A_j \sin\phi_j}\right)$$

$$= \frac{A_i}{\sum_{j=1}^{N} A_j} \sin\left(\phi_i + \tan^{-1} \frac{\sum_{j=1}^{N} A_j \cos\phi_j}{\sum_{j=1}^{N} A_j \sin\phi_j}\right) \quad (4)$$

Fig. 6

$$c = \sin\left(\phi' + \tan^{-1}\frac{1}{\tan\phi'}\right) \qquad \text{(provided that } |c|=1\text{)} \qquad (5)$$

$$\frac{\partial \beta}{\partial \phi_i} = \frac{A_i}{\sum_{j=1}^{N} A_j} \cdot c \qquad (6)$$

$$\sigma_\beta'^2 = \left(\frac{\partial \beta}{\partial \phi_1}\right)^2 \sigma_1^2 + \cdots + \left(\frac{\partial \beta}{\partial \phi_i}\right)^2 \sigma_i^2 + \cdots + \left(\frac{\partial \beta}{\partial \phi_N}\right)^2 \sigma_N^2$$

$$= \left(\frac{c}{\sum_{j=1}^{N} A_j}\right)^2 (A_1^2 \sigma_1'^2 \sigma_S^2 + \cdots + A_i^2 \sigma_i'^2 \sigma_S^2 + \cdots + A_N^2 \sigma_N'^2 \sigma_S^2)$$

$$= \left(\frac{c}{\sum_{j=1}^{N} A_j}\right)^2 \sigma_S^2 (A_1^2 \sigma_1'^2 + \cdots A_i^2 \sigma_i'^2 + \cdots + A_N^2 \sigma_N'^2)$$

$$= \left(\frac{c}{\sum_{j=1}^{N} A_j}\right)^2 \sigma_S^2 \sum_{i=1}^{N} (A_i^2 \sigma_i'^2) \qquad (7)$$

$$\sigma_i = \sigma_i' \cdot \sigma_S \qquad (8)$$

Fig. 7

$$\begin{cases} A_i = A_S \\ \sigma'_i = 1 \end{cases} \quad (9)$$

$$\sigma'^2_S = \left(\frac{c}{N \cdot A_S}\right)^2 \sigma^2_S (N \cdot A_S^2) = \frac{c^2}{N} \sigma^2_S \quad (10)$$

$$\frac{\sigma'^2_\beta}{\sigma'^2_S} = \frac{\left(\frac{c}{\sum_{j=1}^{N} A_j}\right)^2 \sigma^2_S \sum_{i=1}^{N}(A_i^2 \sigma'^2_i)}{\frac{c^2}{N}\sigma^2_S} = \frac{N \sum_{i=1}^{N}(A_i^2 \sigma'^2_i)}{\left(\sum_{j=1}^{N} A_j\right)^2} \quad (11)$$

$$\sigma'_i = \frac{A_S}{A_i} \quad (12)$$

$$\frac{\sigma'^2_\beta}{\sigma'^2_S} = \frac{N\sum_{i=1}^{N}(A_i^2 \sigma'^2_i)}{\left(\sum_{i=1}^{N} A_i\right)^2} = \frac{N\sum_{i=1}^{N}\left\{A_i^2 \left(\frac{A_S}{A_i}\right)^2\right\}}{\left(\sum_{i=1}^{N} A_i\right)^2} = \frac{N^2 A_S^2}{\left(\sum_{i=1}^{N} A_i\right)^2} = \frac{A_S^2}{\left(\frac{\sum_{i=1}^{N} A_i}{N}\right)^2} = \frac{A_S^2}{A'^2} \quad (13)$$

$$A' = \frac{\sum_{i=1}^{N} A_i}{N} \quad (14)$$

Fig. 8

$$\sigma'_i = \sqrt{\frac{A_S}{A_i}} \tag{15}$$

$$\frac{\sigma'^2_\beta}{\sigma'^2_S} = \frac{N\sum_{i=1}^{N}(A_i^2 \sigma'^2_i)}{\left(\sum_{i=1}^{N} A_i\right)^2} = \frac{N\sum_{i=1}^{N}\left\{A_i^2 \left(\sqrt{\frac{A_S}{A_i}}\right)^2\right\}}{\left(\sum_{i=1}^{N} A_i\right)^2} = \frac{N A_S \sum_{i=1}^{N} A_i}{\left(\sum_{i=1}^{N} A_i\right)^2} = \frac{N A_S}{\sum_{i=1}^{N} A_i} = \frac{A_S}{\frac{\sum_{i=1}^{N} A_i}{N}} = \frac{A_S}{A'} \tag{16}$$

DISTANCE MEASURING DEVICE AND METHOD THEREOF

BACKGROUND OF THE INVENTION

The present invention relates to a distance measuring device by a phase difference method that emits a distance measuring light toward a target and receives a reflected light from the target.

A conventional distance measuring device will be described with reference to FIG. 1 to FIG. 3.

Figure 1:
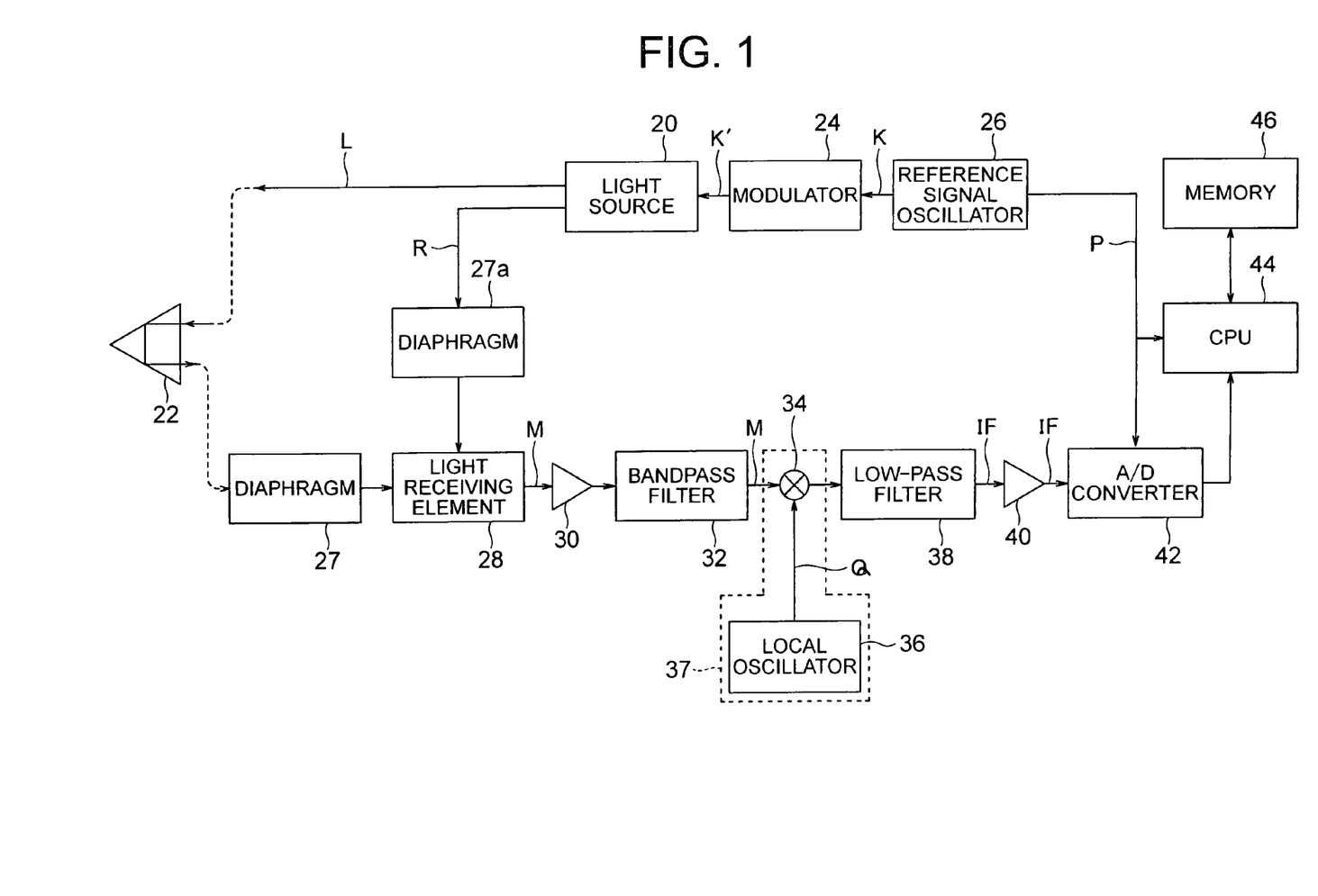
FIG. 1: A block diagram of a distance measuring device according to a conventional art or present invention.

As shown in the block diagram of FIG. 1, in this distance measuring device, a distance measuring light L transmitted from a light source 20 such as a laser diode is emitted toward a target (such as a prism) 22 placed on a survey point via an unillustrated light transmitting optical system. Since the light source 20 is connected to a modulator 24, the distance measuring light L is transmitted by a signal K' modulated based on a reference signal K generated by a reference signal oscillator 26.

The distance measuring light L reflected on the target 22 is led to a light receiving element 28 such as a photo diode via an unillustrated light receiving optical system and a diaphragm 27 that adjusts the light amount of the distance measuring light L. Then, by the light receiving element 28, the distance measuring light L is converted to a distance measuring signal M being an electrical signal, and the distance measuring signal M is denoised by a bandpass filter 32 after being amplified by a high-frequency amplifier 30.

Furthermore, this distance measuring signal M is multiplied, by a frequency converter 37 composed of a mixer 34 and a local oscillator 36, with a local oscillation signal Q generated by the local oscillator 36 and is converted to two frequencies of a frequency to be a sum of frequencies of both signals M and Q and a frequency to be a difference of frequencies of both signals M and Q. Here, after screening only the frequency to be a difference of frequencies of both signals M and Q by the low-pass filter 38 to lower the frequency to an intermediate frequency signal IF, this is amplified by an intermediate frequency amplifier 40. The amplified intermediate frequency signal IF is converted to a digital signal by an A/D converter 42, is inputted into a CPU 44 (operation means), and is stored in a memory (storage means) 46.

When carrying out a distance measurement, the reference signal oscillator 26 transmits a synchronizing signal P to the CPU 44 and A/D converter 42 and transmits a reference signal K to the modulator 24. In this manner, the A/D converter 42 carries out sampling in synchronization with the reference signal K. During this distance measurement, the degree of opening of the diaphragm 27 is fixed.

Figure 2:
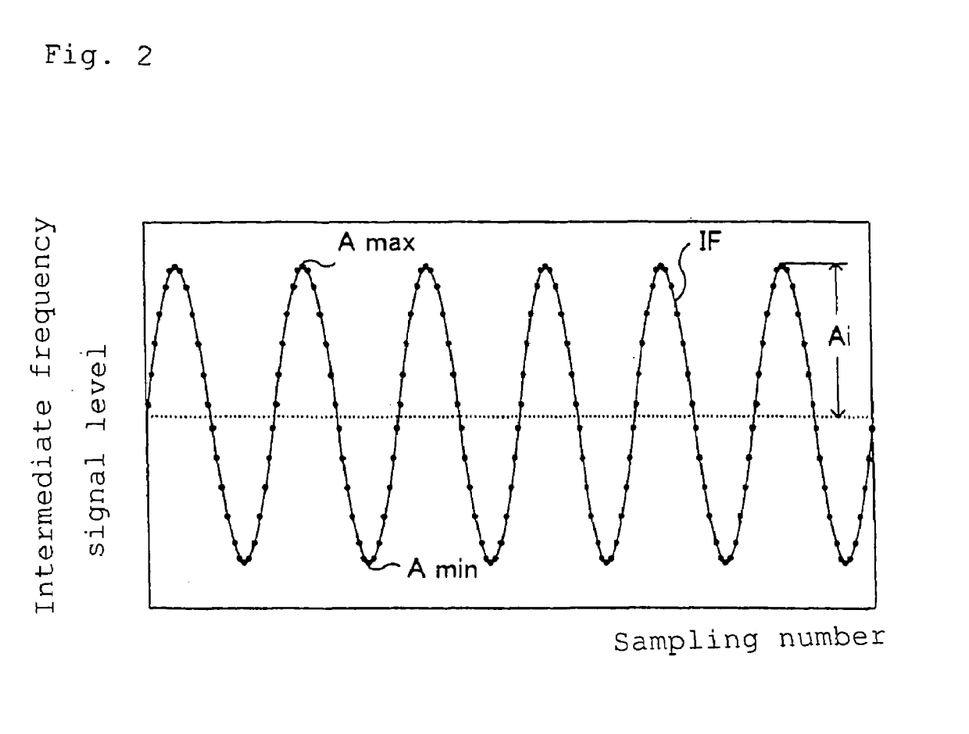
FIG. 2: A diagram showing a sampling example of an intermediate frequency signal in the distance measuring device.

As shown in FIG. 2, sampling timing of the A/D converter 42 is determined so as to always sample one cycle of the intermediate frequency signal IF at fixed phase angle positions, for example, so as to divide one cycle into n (n≧3) equal parts. The intermediate frequency signal IF is consecutively sampled at this sampling timing for more than a few thousands of a large number of cycles. At this time, sampling data of the intermediate frequency signal IF that is beyond an input range of the A/D converter 42 or that is too small relative to the input range is discarded.

Figure 3:
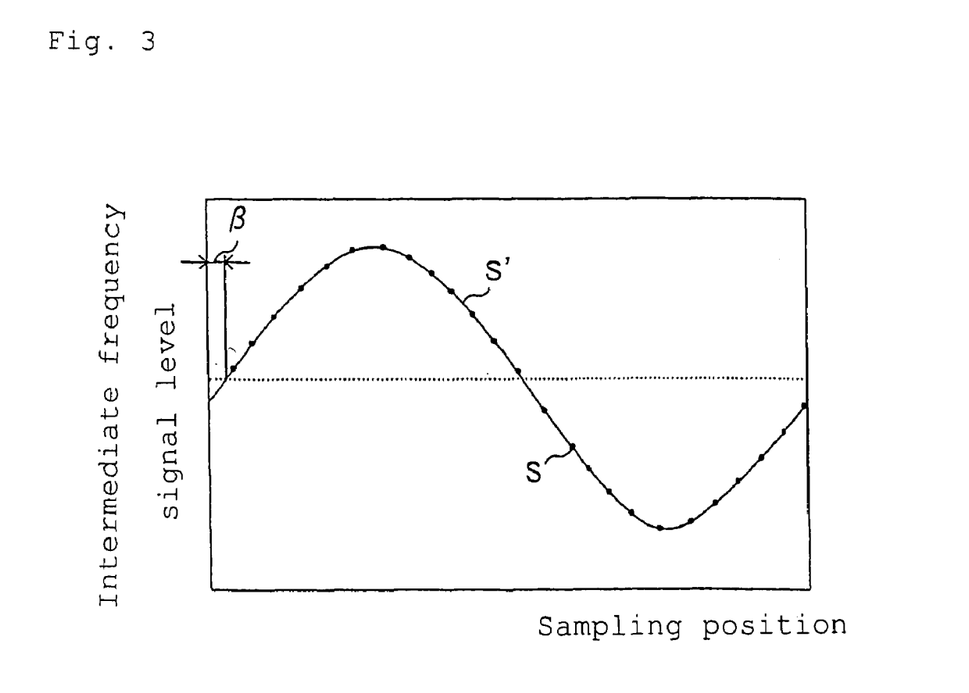
FIG. 3: A diagram showing a synthetic data of one cycle of an intermediate frequency for which sampling data of the intermediate frequency signal at the same phase position has been added and a synthetic sine wave obtained from the synthetic data.

In order to store the sampling data in the memory 46, a storage area for n pieces of data equal to one cycle of the intermediate frequency signal IF is prepared in the memory 46, and as shown in FIG. 3, sampling data at the same phase position is added for storage. In this manner, synthetic data S of one cycle of the intermediate frequency signal IF with large amplitude for which the sampling data at the same phase position has been added is created. This synthetic data S is applied to a synthetic sine wave S' by the method of least square to determine an initial phase β of this synthetic sine wave S'. Since the A/D converter 42 carries out sampling in synchronization with the reference signal K, the initial phase β is equalized to a phase difference between a signal obtained by dividing the reference signal K to the same frequency as that of the intermediate frequency signal IF and the intermediate frequency signal IF, and a distance from the initial phase β to the target 22 is calculated.

Meanwhile, owing to shimmering of air from heat, since the light amount of the distance measuring light L that is made incident into the light receiving element 28 greatly fluctuates even during a measurement, it becomes necessary to correct the initial phase β owing to the fluctuation of the distance measuring light L.

Therefore, in this distance measuring device, at the time of adjustment following completion of assembly, for each machine, after collimating of an identical target, the degree of opening of the diaphragm 27 is changed so as to change the light amount of the distance measuring light L made incident into the light receiving element 28, while an amount of correction of the initial phase necessary at the amplitude (which is a value corresponding to the light amount of the distance measuring light L made incident into the light receiving element 28 or the amplitude of the distance measuring signal M) of the intermediate frequency signal IF inputted into the A/D converter 42 is found, and this is written into a correction table storage area provided in the memory 46. This correction amount is an amount that changes according to amplitude of the intermediate frequency signal IF. Namely, the correction amount is a function of the amplitude.

When measuring the distance, as shown in FIG. 3, the synthetic sine wave S' calculated based on the synthetic data S for which sampling data of the intermediate frequency signal IF has been added for each same phase position for a large number of cycles is used. Therefore, a correction amount Δβ of the initial phase β of this synthetic sine wave S' is expressed, where amplitude according to an i-th wave of the intermediate frequency signal IF is provided as Ai and a correction amount at this amplitude Ai is provided as Δφi(Ai), as: $\Delta\beta = \tan^{-1}[\Sigma\{Ai \cdot \sin(\Delta\phi i(Ai))\}/\Sigma\{Ai \cdot \cos(\Delta\phi i(Ai))\}]$. Here, since Δφi(Ai) is generally small, it can be approximated as $\Delta\beta = \tan^{-1}[\Sigma\{Ai \cdot \Delta\phi i(Ai)\}/\Sigma Ai] = \Sigma\{Ai \cdot \Delta\phi i(Ai)\}/\Sigma Ai$. Consequently, the correction amount Δβ of the initial phase β is a weighted average obtained by weighting the correction amount Δφi(Ai) with the amplitude Ai of the intermediate frequency signal IF. A true initial phase can be obtained by subtracting the foregoing correction amount Δβ from the measured initial phase β.

In this distance measuring device, prior to a distance measurement, the distance measuring device is actuated to carry out preliminary sampling to sample a few cycles of the intermediate frequency signal IF preliminarily. This is carried out to detect sampling positions at the maximum level Amax and the minimum level Amin within one-cycle range of the intermediate frequency signal IF and to thereby simplify the subsequent detection of the amplitude Ai. In addition, in order to obtain frequency distribution of the amplitude Ai, the amplitude range is divided into a plurality of grades, and a storage area to hold frequencies of the respective grades is prepared in the memory 46.

Then, a distance measurement is started, and every time one cycle of the intermediate frequency signal IF has been detected, the synthetic data S (FIG. 3) for which sampling data at the same phase position has been added is stored in the memory 46, and based on ½ of a difference in levels between the sampling positions that have indicated the maximum level Amax and the minimum level Amin determined from the result of the preliminary sampling prior to the distance measurement, a grade of the amplitude Ai of the intermediate frequency signal IF is determined, 1 is added to the frequency of that grade, and frequency distribution of the amplitude Ai is also stored in the memory 46. After completion of the sampling, the initial phase β is determined by use of the synthetic sine wave S' of the intermediate frequency signal IF, and by use of the frequency distribution of the amplitude Ai, the weighted average $\Sigma\{Ai \cdot \Delta\phi i(Ai)\}/\Sigma Ai$ obtained by weighting the correction amount $\Delta\phi i(Ai)$ with the amplitude Ai of the intermediate frequency signal IF, namely, the correction amount Δβ is calculated. Then, the correction amount Δβ is subtracted from the initial phase β to calculate a distance to the target 22.

As a matter of course, in this distance measuring device as well, the distance measuring light L can be switched to a reference light R that leads to the light receiving element 28 through an internal light path including a diaphragm 27a. By carrying out a distance measurement by use of the reference light R, the distance determined by use of the foregoing distance measuring light L can be corrected. Such a device is disclosed in Japanese Published Unexamined Patent Application No. 2004-264116.

In such a distance measuring device, since the distance has been calculated after consecutively sampling the intermediate frequency signal IF for more than a few thousands of a large number of cycles, a predetermined time has been necessary for a distance measurement. However, in recent years, a further reduction in the time required for a distance measurement has been demanded. Therefore, in order to reduce the time required for a measurement of the distance measuring device, if a reduction in the number of cycles of the intermediate frequency signal IF to be sampled is attempted, in, particularly, the case of a long-distance measurement, deficiency in the receiving light amount of the distance measuring light L frequently occurs owing to shimmering of air from heat, therefore, a problem of degradation in accuracy of the measured value arises.

SUMMARY OF THE INVENTION

The present invention has been made in view of the problem described above, and an object thereof is, in a distance measuring device by a phase difference method, to reduce the time required for a distance measurement without degrading accuracy of the measured value.

In order to achieve the above-described object, a first aspect of the invention is characterized in that, in a distance measuring device comprising a reference signal oscillator that generates a reference signal, a light source that emits a distance measuring light modulated based on the reference signal, a light transmitting optical system that transmits a distance measuring light, a light receiving optical system that receives a distance measuring light reflected from a target, a light receiving element that converts a received distance measuring light to a distance measuring signal, a sampling unit that samples the distance measuring signal, a quantization unit that quantizes the sampled distance measuring signal, a storage unit that stores quantized distance measuring signal data, and an operation unit that calculates a distance based on a phase difference between the reference signal and distance measuring signal, the operation unit calculates amplitude of each frequency of the distance measuring signal based on the distance measuring signal data, determines frequency distribution of the amplitude, and ends sampling to calculate a distance when the number of pieces of the distance measuring signal data is equal to or more than a minimum required number and it can be estimated, from the frequency distribution of the amplitude, that variance of the distance is equal to or less than a predetermined value.

A second aspect of the invention is characterized in that, in a distance measuring method using a reference signal oscillator that generates a reference signal, a light source that emits a distance measuring light modulated based on the reference signal, a light transmitting optical system that transmits a distance measuring light, a light receiving optical system that receives a distance measuring light reflected from a target, a light receiving element that converts a received distance measuring light to a distance measuring signal, a sampling unit that samples the distance measuring signal, a quantization unit that quantizes the sampled distance measuring signal, a storage unit that stores quantized distance measuring signal data, and an operation unit that calculates a distance based on a phase difference between the reference signal and distance measuring signal, the operation unit calculates amplitude of each frequency of the distance measuring signal based on the distance measuring signal data, determines frequency distribution of the amplitude, and ends sampling to calculate a distance when the number of pieces of the distance measuring signal data is equal to or more than a minimum required number and it can be estimated, from the frequency distribution of the amplitude, that variance of the distance is equal to or less than a predetermined value.

A third aspect of the invention is characterized in that, in a distance measuring device comprising a reference signal oscillator that generates a reference signal, a light source that emits a distance measuring light modulated based on the reference signal, a light transmitting optical system that transmits a distance measuring light, a light receiving optical system that receives a distance measuring light reflected from a target, a light receiving element that converts a received distance measuring light to a distance measuring signal, a sampling unit that samples the distance measuring signal, a quantization unit that quantizes the sampled distance measuring signal, a storage unit that stores quantized distance measuring signal data, and an operation unit that calculates a distance based on a phase difference between the reference signal and distance measuring signal, the operation unit calculates amplitude of each frequency of the distance measuring signal based on the distance measuring signal data, determines an average of the amplitude, and ends sampling to calculate a distance when the number of pieces of the distance measuring signal data is equal to or more than a minimum required number and the average becomes equal to or more than a predetermined value.

A fourth aspect of the invention is characterized in that, in a distance measuring device comprising a reference signal oscillator that generates a reference signal, a light source that emits a distance measuring light modulated based on the reference signal, a light transmitting optical system that transmits a distance measuring light, a light receiving optical system that receives a distance measuring light reflected from a target, a light receiving element that converts a received distance measuring light to a distance measuring signal, a frequency converter that converts the distance measuring signal to an intermediate signal of a lowered frequency, an A/D converter that samples the intermediate frequency signal in synchronization with the reference signal, a storage unit that stores intermediate frequency signal data sampled by the A/D converter, and an operation unit that calculates a distance based on the intermediate frequency signal data, the operation unit calculates amplitude of each frequency of the intermediate frequency signal based on the intermediate frequency signal data, determines an average of the amplitude, and ends sampling to calculate a distance when the number of pieces of the intermediate frequency signal data is equal to or more than a minimum required number and the average becomes equal to or more than a predetermined value.

A fifth aspect of the invention is characterized in that, in a distance measuring method using a reference signal oscillator that generates a reference signal, a light source that emits a distance measuring light modulated based on the reference signal, a light transmitting optical system that transmits a distance measuring light, a light receiving optical system that receives a distance measuring light reflected from a target, a light receiving element that converts a received distance measuring light to a distance measuring signal, a frequency converter that converts the distance measuring signal to an intermediate signal of a lowered frequency, an A/D converter that samples the intermediate frequency signal in synchronization with the reference signal, a storage unit that stores intermediate frequency signal data sampled by the A/D converter, and an operation unit that calculates a distance based on the intermediate frequency signal data, the operation unit calculates amplitude of each frequency of the intermediate frequency signal, determines an average of the amplitude, and ends sampling to calculate a distance when the number of pieces of the intermediate frequency signal data is equal to or more than a minimum required number and the average becomes equal to or more than a predetermined value.

According to the distance measuring device of the first and second aspects of the invention, since frequency distribution of the amplitude of the sampled measuring signal has been determined, when the number of pieces of the distance measuring signal data has become equal to or more than a minimum required number, dispersion (variance, standard deviation, range, average deviation, quantile deviation, and the like) of the amplitude can also be calculated from the frequency distribution of the amplitude, and furthermore, variance of the measured distance can also be estimated from the dispersion of the amplitude. Thereby, when it can be estimated that variance of the measured distance becomes equal to or less than a predetermined value, sampling can be immediately ended to calculate a distance required by accuracy specifications. Therefore, according to the present invention, the time required for a distance measurement can be reduced without degrading accuracy of the measured value.

According to the distance measuring device of the third aspect of the invention, since frequency distribution of the amplitude of the sampled measuring signal has been determined, an average of the amplitude can be calculated. Since variance of the measured distance becomes smaller as the light receiving amount of the distance measuring light, that is, the amplitude is greater, when the number of pieces of the distance measuring signal data is equal to or more than a minimum required number and the average of the amplitude becomes equal to or more than a predetermined value, it can be estimated that variance of the measured distance has became equal to or less than a predetermined value required by accuracy specifications. At this time, by immediately ending sampling to calculate a distance, in this distance measuring device, the time required for a distance measurement can be reduced without degrading accuracy of the measured value.

According to the distance measuring device of the first and second aspects of the invention, since frequency distribution of the amplitude of the sampled intermediate frequency signal has been determined, an average of the amplitude can be calculated. Since variance of the measured distance becomes smaller as the light receiving amount of the distance measuring light, that is, the amplitude is greater, when the number of pieces of the intermediate frequency signal data is equal to or more than a minimum required number and the average of the amplitude has became equal to or more than a predetermined value, it can be estimated that variance of the measured distance becomes equal to or less than a predetermined value required by accuracy specifications. At this time, by immediately ending sampling to calculate a distance, in this distance measuring device, the time required for a distance measurement can be reduced without degrading accuracy of the measured value. Moreover, according to the present invention, after converting the distance measuring signal to an intermediate frequency signal of a lowered frequency and amplifying at high gain while stably denoising the same, the intermediate frequency signal is sampled, it becomes possible to carry out a high-accuracy distance measurement until a long distance.

DESCRIPTION OF THE DRAWINGS

Hereinafter, a preferred embodiment of a distance measuring device according to the present invention will be described in detail with reference to the accompanying drawings, wherein.

DETAILED DESCRIPTION OF THE PREFERRED EMBODIMENT

This distance measuring device also has a configuration shown by the same block diagram as that of the conventional distance measuring device shown in FIG. 1, and this samples, as shown in FIG. 2, an intermediate frequency signal IF for a large number of cycles, as shown in FIG. 3, adds sampling data of the intermediate frequency signal IF at the same phase position to determine synthetic data S, determines a synthetic sine wave S' by calculation while applying the synthetic data S to a sine wave form, and calculates a distance based on an initial phase β of the synthetic sine wave S'. Therefore, description of the same parts of the distance measuring device as those of the conventional art will be omitted.

However, when determining sampling data, the CPU 44 of this distance measuring device does not always sample the intermediate frequency signal IF for more than a few thousands of a large number of cycles as in the conventional art, but ends sampling, if it judges that sampling of a sufficient number for a distance measurement has been finished, to immediately calculate a distance, and displays the measured value. Therefore, in this distance measuring device, the time required for a distance measurement can be greatly reduced.

Figure 4:
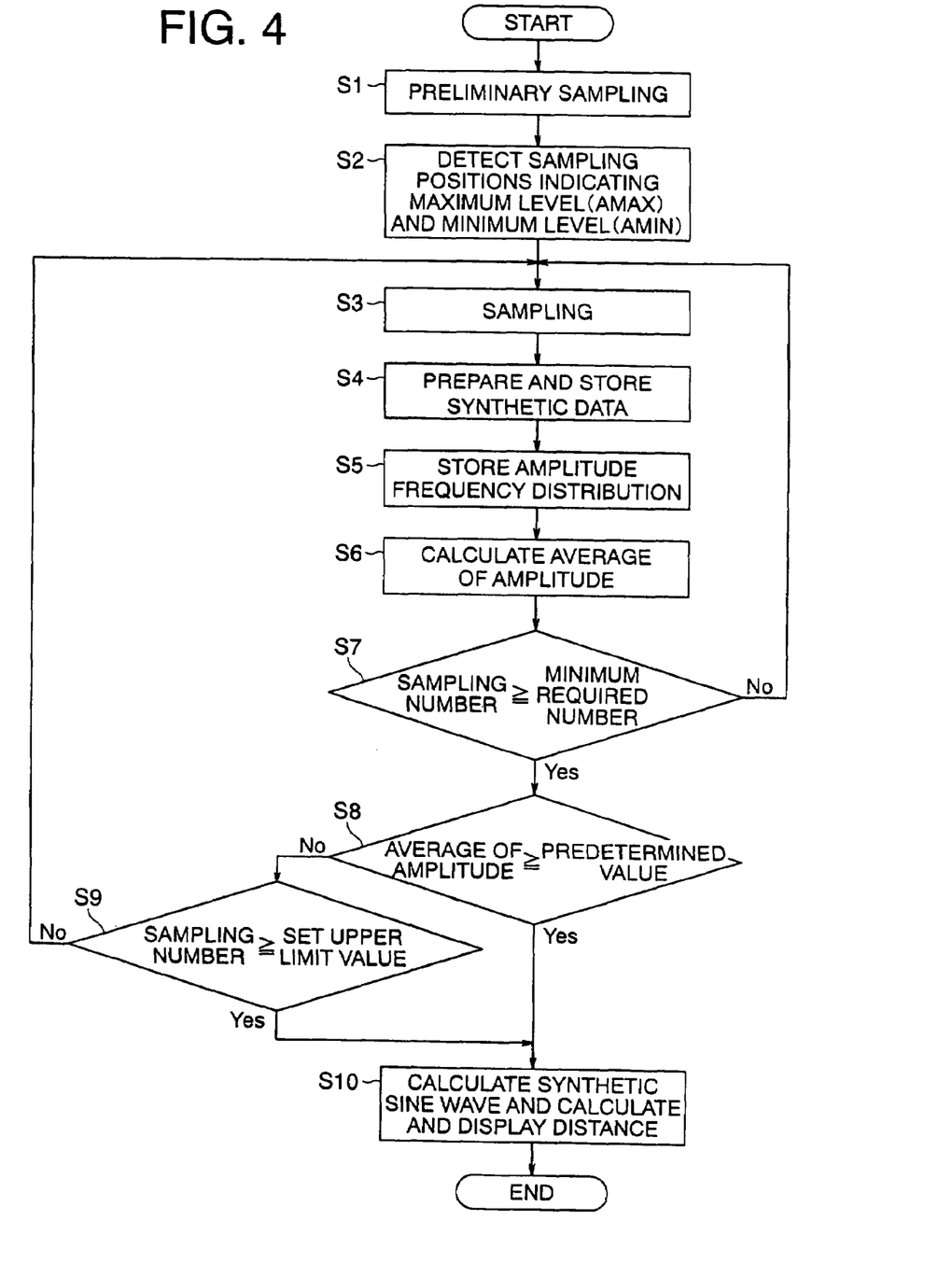
FIG. 4: A flowchart for explaining operations of a distance measuring device according to the present invention.

Based on FIG. 4, processes executed by the CPU 44 at the time of distance measurement by this distance measuring device will be described. First, when it starts a distance measurement, it proceeds to step 1, actuates the distance measuring device to carry out, similar to the conventional art, preliminary sampling to sample a few cycles of the intermediate frequency signal IF preliminarily. Next, it proceeds to step S2 and detects a sampling position indicating a maximum level Amax and a position indicating a minimum level Amin based on the preliminary sampled intermediate frequency signal IF.

Next, it proceeds to step 3 and samples one cycle of the intermediate frequency signal IF. Next, it proceeds to step S4, as shown in FIG. 3, adds sampling data at the same phase position to create synthetic data S, and stores this synthetic data S in the memory 46. Furthermore, it proceeds to step S5 and stores frequency distribution of amplitude Ai of the intermediate frequency signal IF in the memory 46. Here, ½ of a difference in levels of sampling data between the sampling position indicating the maximum level and sampling position indicating the minimum level detected by the preliminary sampling is determined as the amplitude Ai. Furthermore, it proceeds to step S6 and calculates an average of the amplitude Ai of the intermediate frequency signal IF.

Subsequently, it proceeds to step S7 and checks whether or not the sampling number (number of frequencies of the sampled intermediate frequency signal IF) has reached a minimum required number or more. If the sampling number is less than the minimum required number, it returns to step S3 for judging that there is a problem in reliability of the measured value and repeats steps S3 to S7. When the sampling number has reached the minimum required number or more, it proceeds to step S8 and checks whether or not the average of the amplitude Ai has reached a predetermined value or more.

In step S8, if the average of the amplitude Ai is equal to or more than the predetermined value, it proceeds to step S10, ends sampling, similar to the conventional art, determines a synthetic sine wave S' based on the synthetic data S to calculate a distance, displays the measured value on an unillustrated display section, and ends measurement. This is because it can be judged that if a distance measuring signal obtained from a sufficient light amount of distance measuring light can be sampled for the minimum required number or more of cycles, an error and variance of the measured value are reduced and specification accuracy is satisfied. Thereby, the time required for a distance measurement can be greatly reduced in comparison with the conventional art.

In step S8, if a sufficient light amount of distance measuring light cannot be obtained and the average of the amplitude Ai has not reached the previously provided predetermined value, it proceeds to step S9 and checks whether or not the sampling number has reached a set upper limit value conventionally provided or more. If the sampling number is less than the set upper limit set value, it returns to step S3 for judging that there is a problem in reliability of the measured value and returns steps S3 to S9. When the sampling number has reached the set upper limit, it proceeds to step S10, ends sampling, similar to the conventional art, determines a synthetic sine wave S' based on the synthetic data S to calculate a distance, displays the measured value on an unillustrated display section, and ends measurement.

According to the distance measuring device of the present embodiment, since frequency distribution of the amplitude Ai of the intermediate frequency signal IF has been determined, an average of the amplitude Ai can be calculated. The greater the light receiving amount of the distance measuring light L, that is, the average of the amplitude Ai is, the more the variance of the measured distance is reduced, therefore, when the sampling number is equal to or more than the minimum required number and the average of the amplitude Ai has become equal to the predetermined value or more, it can be estimated that the variance of the measured distance becomes equal to or less than a predetermined value required by accuracy specifications. At this time, by immediately ending sampling to calculate a distance, in this distance measuring device, the time required for a distance measurement can be reduced without degrading accuracy of the measured value.

Hereinafter, it will be described that variance of the measured value can be evaluated based on an average A' of the amplitude Ai of the intermediate frequency signal IF and the variance of the measured value becomes equal to or less than a predetermined value when the average A' of the amplitude Ai is equal to or more than a predetermined value.

A waveform of the synthetic sine wave S' of the intermediate frequency signal IF shown in FIG. 3 has amplitude α and an initial phase β. Where the amplitude of an i-th wave of the intermediate frequency signal IF shown in FIG. 2 is provided as Ai, the initial phase of the same i-th wave is provided as φi, and the total number of waves to be sampled and added in synchronization is provided as N, expression (1) of FIG. 5 can be obtained. In this expression (1), β shown by expression (2) in FIG. 5 is a part indicating a distance, and the distance is calculated by multiplying this β by a proper coefficient.

Figure 5:
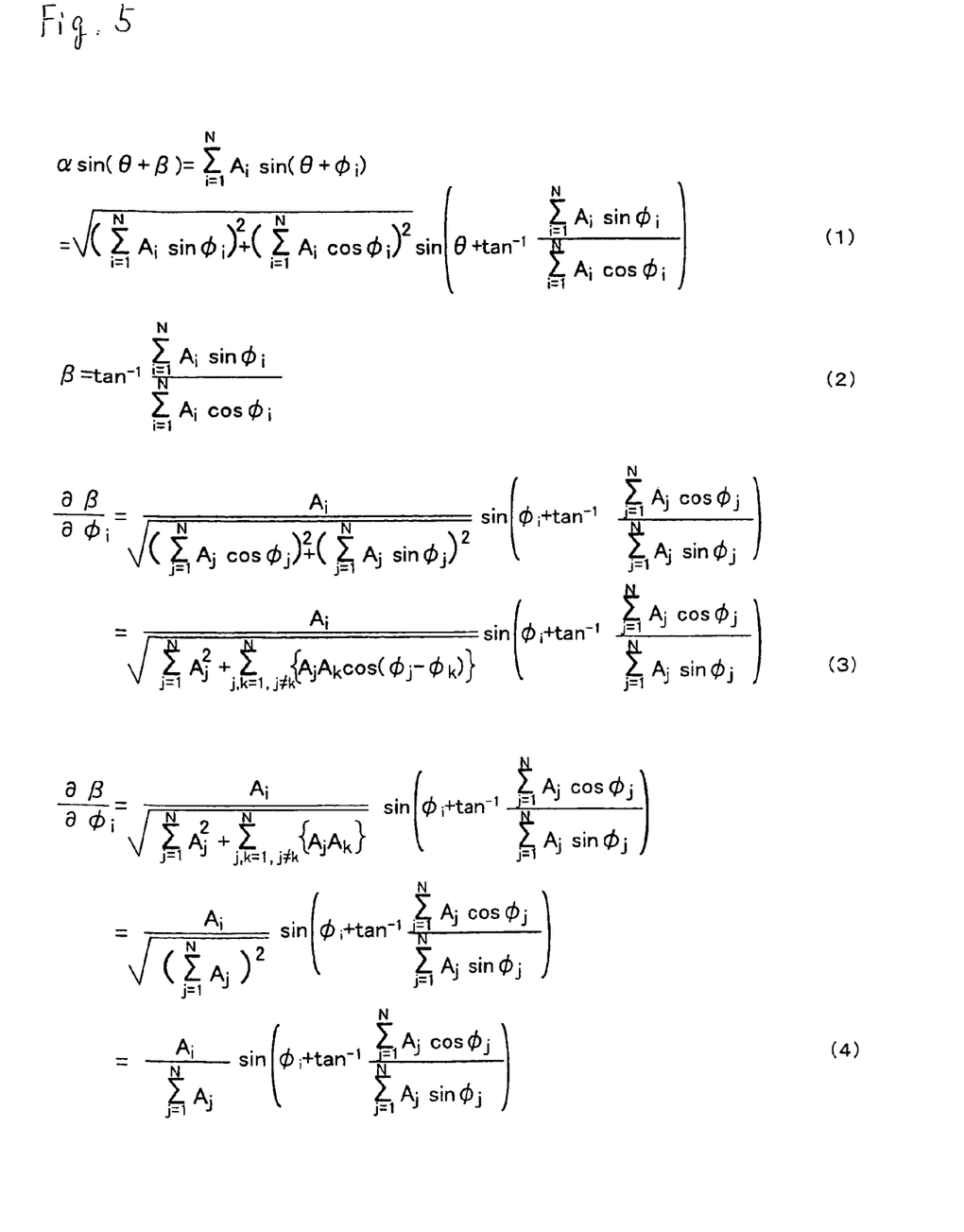
FIG. 5: Expressions for describing a calculation process for deriving an expression to evaluate variance of measured distances.

Here, in order to estimate accuracy of the initial phase β, when this β is partially differentiated with φi, it is arranged as in expression (3) of FIG. 5.

Figure 6:
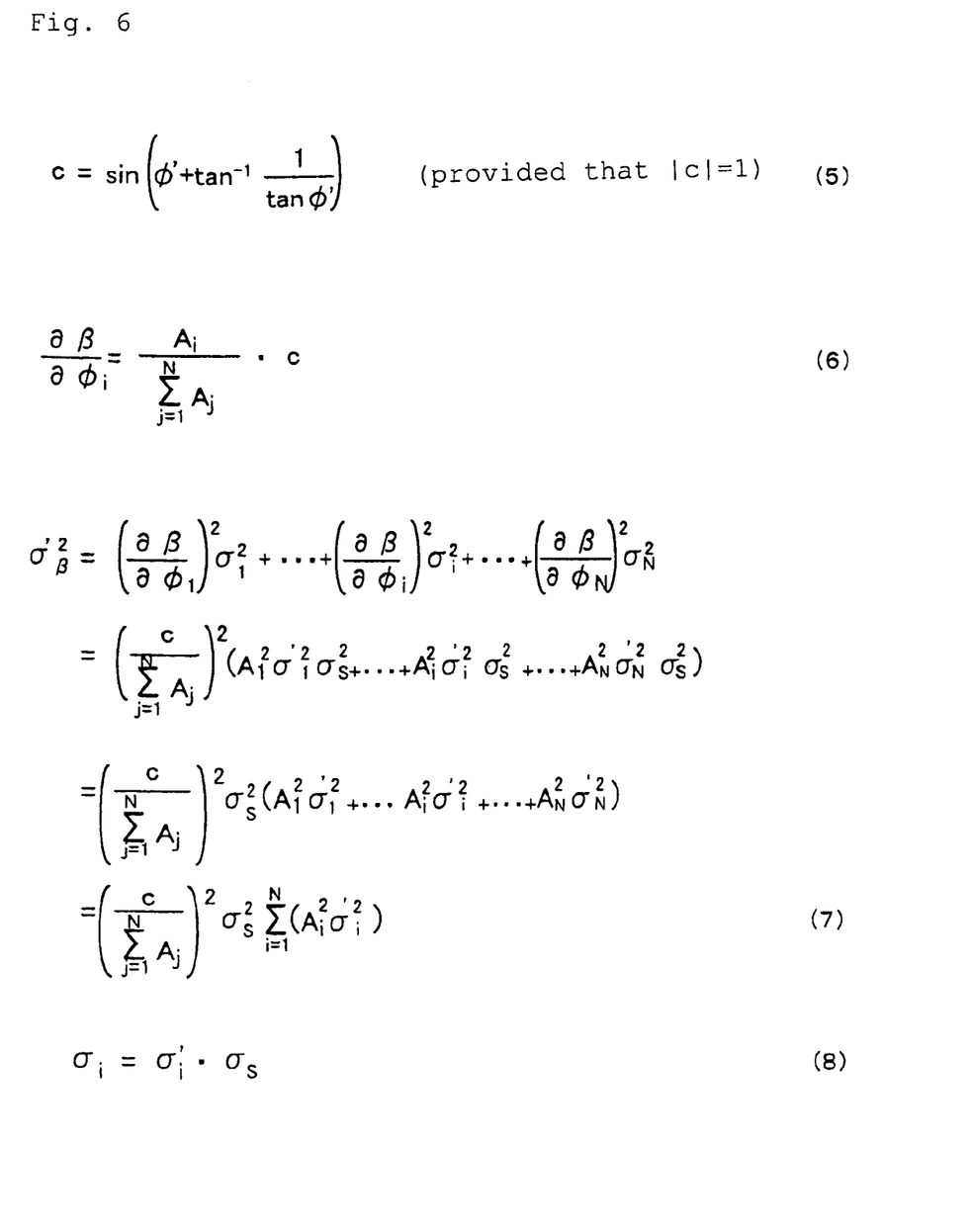
FIG. 6: Expressions for describing a calculation process for deriving an expression to evaluate variance of measured distances.

Here, when |φj−φk|<<1 is assumed, expression (3) can also be expressed as in expression (4) of FIG. 5. And, when φ'≈φ1≈φ2≈φ3≈φ4 . . . ≈φN is assumed, and furthermore, when c defined by expression (5) of FIG. 6 is used, expression (4) can be simplified as shown by expression (6) of FIG. 6.

Therefore, accuracy of the initial phase β is estimated by the law of error propagation. Where an estimated standard deviation of β is provided as σ'β, variance $\sigma'\beta^2$ of β is as in expression (7) of FIG. 6.

However, σi denotes a standard deviation of φi, and when the amplitude Ai is great, S/N is high, and the standard deviation φi of φi is reduced, and when the amplitude Ai is small, S/N is low, and the standard deviation σi of φi is increased. Consequently, the standard deviation σi serves as a function of the amplitude Ai, and this can be expressed as σi=σi(Ai). In addition, σs is a standard deviation of an initial phase calculated when the intermediate frequency signal IF of a previously provided standard amplitude As has been inputted into the A/D converter 42. This σs has been previously determined, at the time of adjustment following completion of assembly, by emitting a distance measuring light L after collimating of an identical target, receiving the reflected distance measuring light L, and adjusting the diaphragm 27. Furthermore, σ'i is a dimensionless constant to make a correlation between σi and σs so as to satisfy expression (8) of FIG. 6.

Here, variance $\sigma's^2$ of the initial phase when N waves of the intermediate frequency signal IF of the standard amplitude As are added in synchronization is estimated. Therefore, when the condition shown in expression (9) of FIG. 7 is substituted for expression (7) and the value of $\sigma'\beta^2$ of the moment is provided as $\sigma's^2$, $\sigma's^2$ can be expressed by expression (10) of FIG. 7.

Figure 7:
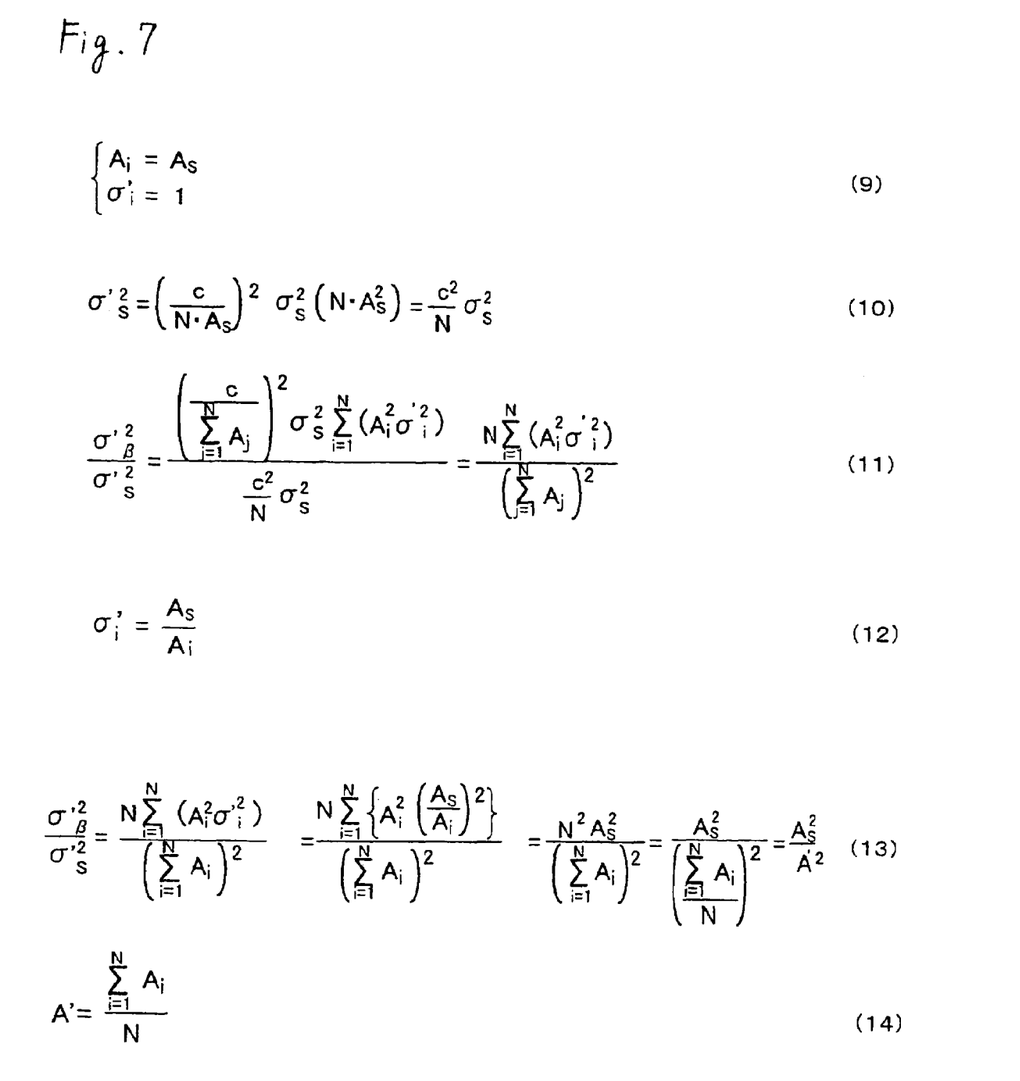
FIG. 7: Expressions for describing a calculation process for deriving an expression to evaluate variance of measured distances.

Here, when a ratio $\sigma'\beta^2/\sigma's^2$ between the estimated variance $\sigma'\beta^2$ of the initial phase β determined by expression (7) and $\sigma's^2$ determined by expression (10) is determined, expression (11) of FIG. 7 can be obtained. Based on this expression (11), deterioration in variance of this time's measured value can be estimated and evaluated relative to variance of the measured value in an optimal environment.

Now, while concretely assuming a value of σ'i, a variance ratio of expression (11) will be discussed. When a standard deviation of the measured value is proportional to amplitude (such as when noise is constantly occurring in an electronic circuit or thermal noise is dominant. In addition, temperature is also related in the case of thermal noise.), since expression (12) of FIG. 7 can be estimated, if this expression (12) is substituted for expression (11), expression (13) can be obtained. However, A' of expression (13) is, as shown in expression (14) of FIG. 7, an average of the amplitude Ai. Namely, a square of a ratio between the standard amplitude As and measured average amplitude A' serves as an evaluation value, and the smaller this evaluation value is, the smaller variance of the initial phase β, that is, the measured distance is. Accordingly, since the standard amplitude As has been previously provided, if the average A' of the amplitude Ai is equal to or more than a predetermined value, variance of the measured distance becomes equal to or less than a predetermined value, thus previously provided accuracy specifications of the measured value can be satisfied.

Figure 8:
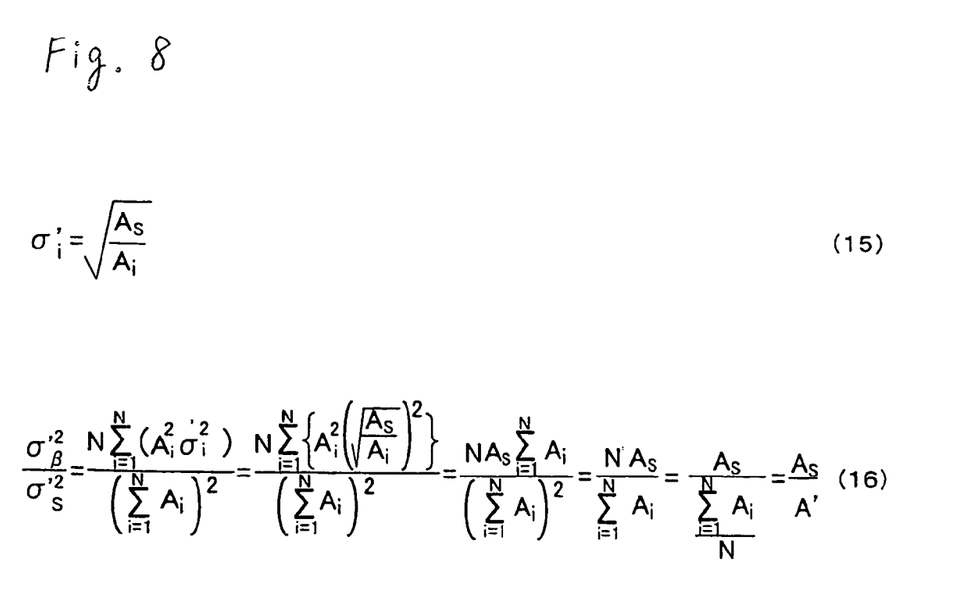
FIG. 8: Expressions for describing a calculation process for deriving an expression to evaluate variance of measured distances.

When a standard deviation of the measured value is proportional to a square root of amplitude (such as when shot noise that occurs in the light receiving element 28 is dominant), since expression (15) of FIG. 8 can be estimated, if this expression (15) is substituted for expression (11), expression (16) of FIG. 8 can be obtained. Namely, a ratio between the standard amplitude As and measured average amplitude A' serves as an evaluation value. In this case as well, the smaller this evaluation value is, the smaller variance of the initial phase β, that is, the measured distance is, therefore, if the average A' of the amplitude Ai is equal to or more than a predetermined value, variance of the measured distance becomes equal to or less than a predetermined value, thus previously provided accuracy specifications of the measured value can be satisfied.

In either case, since the accuracy specifications of the measurement value can be satisfied as long as the average A' of the amplitude Ai becomes equal to or more than a predetermined value and the light receiving element 28 can receive a sufficient distance measuring light, it is sufficient to determine a predetermined value to be satisfied by the average A' of the amplitude Ai previously through experiments or the like.

Meanwhile, the present invention is not limited to the above-described embodiment and various modifications can be made. For example, in the above-described embodiment, a distance measuring signal M is converted to an intermediate frequency signal IF, and then the intermediate frequency signal IF is sampled, however, in such a case where frequency of a modulated signal K' is low, it is also possible to sample a distance measuring signal M taken out of the bandpass filter 32 directly by the A/D converter 42 and carry out distance measurement by use of the sampled distance measuring signal M.

Moreover, in the above-described embodiment, when the average of the amplitude Ai of the intermediate frequency signal IF becomes equal to or more than a predetermined value, sampling is ended to calculate a distance, however, dispersion (variance, standard deviation, range, average deviation, quantile deviation, and the like) of the amplitude can also be calculated from frequency distribution of the amplitude. Therefore, when it can be estimated, from the dispersion of the same, that variance of the measured distance is equal to or less than a predetermined value, sampling can be ended at that moment to calculate a distance.

| Description of Symbols | |
|---|---|
| 20 | Light source |
| 22 | Target |
| 26 | Reference signal oscillator |
| 28 | Light receiving element |
| 37 | Frequency converter |
| 42 | A/D converter |
| 44 | CPU (operation means) |
| 46 | Memory (storage means) |
| K | Reference signal |
| L | Distance measuring light |
| M | Distance measuring signal |
| IF | Intermediate frequency signal |

What is claimed is:

1. A distance measuring device comprising a reference signal oscillator that generates a reference signal, a light source that emits a distance measuring light modulated based on the reference signal, a light transmitting optical system that transmits a distance measuring light, a light receiving optical system that receives a distance measuring light reflected from a target, a light receiving element that converts a received distance measuring light to a distance measuring signal, a sampling unit that samples the distance measuring signal, a quantization unit that quantizes the sampled distance measuring signal, a storage unit that stores quantized distance measuring signal data, and an operation unit that calculates a distance based on a phase difference between the reference signal and distance measuring signal, wherein the operation unit calculates amplitude of each frequency of the distance measuring signal based on the distance measuring signal data, determines frequency distribution of the amplitude, and ends sampling to calculate a distance when the number of pieces of the distance measuring signal data is equal to or more than a minimum required number and it can be estimated, from the frequency distribution of the amplitude, that variance of the distance is equal to or less than a predetermined value.

2. A distance measuring method comprising the steps of: generating a reference signal by a reference signal oscillator, emitting a distance measuring light modulated based on the reference signal by a light source, transmitting a distance measuring light by a light transmitting optical system receiving a distance measuring light reflected from a target by a light receiving optical system, providing a light receiving element that converts a received distance measuring light to a distance measuring signal, providing a sampling unit that samples the distance measuring signal, providing a quantization unit that quantizes the sampled distance measuring signal, providing a storage unit that stores quantized distance measuring signal data, and providing an operation unit that calculates a distance based on a phase difference between the reference signal and distance measuring signal, wherein the operation unit calculates amplitude of each frequency of the distance measuring signal based on the distance measuring signal data, determines frequency distribution of the amplitude, and ends sampling to calculate a distance when the number of pieces of the distance measuring signal data is equal to or more than a minimum required number and it can be estimated, from the frequency distribution of the amplitude, that variance of the distance is equal to or less than a predetermined value.

3. A distance measuring device comprising a reference signal oscillator that generates a reference signal, a light source that emits a distance measuring light modulated based on the reference signal, a light transmitting optical system that transmits a distance measuring light, a light receiving optical system that receives a distance measuring light reflected from a target, a light receiving element that converts a received distance measuring light to a distance measuring signal, a sampling unit that samples the distance measuring signal, a quantization unit that quantizes the sampled distance measuring signal, a storage unit that stores quantized distance measuring signal data, and an operation unit that calculates a distance based on a phase difference between the reference signal and distance measuring signal, wherein
 the operation unit calculates amplitude of each frequency of the distance measuring signal based on the distance measuring signal data, determines an average of the amplitude, and ends sampling to calculate a distance when the number of pieces of the distance measuring signal data is equal to or more than a minimum required number and the average becomes equal to or more than a predetermined value.

4. A distance measuring device comprising a reference signal oscillator that generates a reference signal, a light source that emits a distance measuring light modulated based on the reference signal, a light transmitting optical system that transmits a distance measuring light, a light receiving optical system that receives a distance measuring light reflected from a target, a light receiving element that converts a received distance measuring light to a distance measuring signal, a frequency converter that converts the distance measuring signal to an intermediate signal of a lowered frequency, an A/D converter that samples the intermediate frequency signal in synchronization with the reference signal, a storage unit that stores intermediate frequency signal data sampled by the A/D converter, and an operation unit that calculates a distance based on the intermediate frequency signal data, wherein
 the operation unit calculates amplitude of each frequency of the intermediate frequency signal based on the intermediate frequency signal data, determines an average of the amplitude, and ends sampling to calculate a distance when the number of pieces of the intermediate frequency signal data is equal to or more than a minimum required number and the average becomes equal to or more than a predetermined value.

5. A distance measuring method comprising the steps of: generating a reference signal by a reference signal oscillator, emitting a distance measuring light modulated based on the reference signal by a light source, transmitting a distance measuring light by a light transmitting optical system, receiving a distance measuring light reflected from a target by a light receiving optical system, providing a light receiving element that converts a received distance measuring light to a distance measuring signal, providing a frequency converter that converts the distance measuring signal to an intermediate signal of a lowered frequency, providing an A/D converter that samples the intermediate frequency signal in synchronization with the reference signal, providing a storage unit that stores intermediate frequency signal data sampled by the A/D converter, and providing an operation unit that calculates a distance based on the intermediate frequency signal data, wherein the operation unit calculates amplitude of each frequency of the intermediate frequency signal, determines an average of the amplitude, and ends sampling to calculate a distance when the number of pieces of the intermediate frequency signal data is equal to or more than a minimum required number and the average becomes equal to or more than a predetermined value.

* * * * *